July 22, 1924.　　　　　　　　　　　　　　1,502,489
C. STEENSTRUP
APPARATUS FOR AUTOMATIC ARC WELDING
Filed Jan. 2, 1920
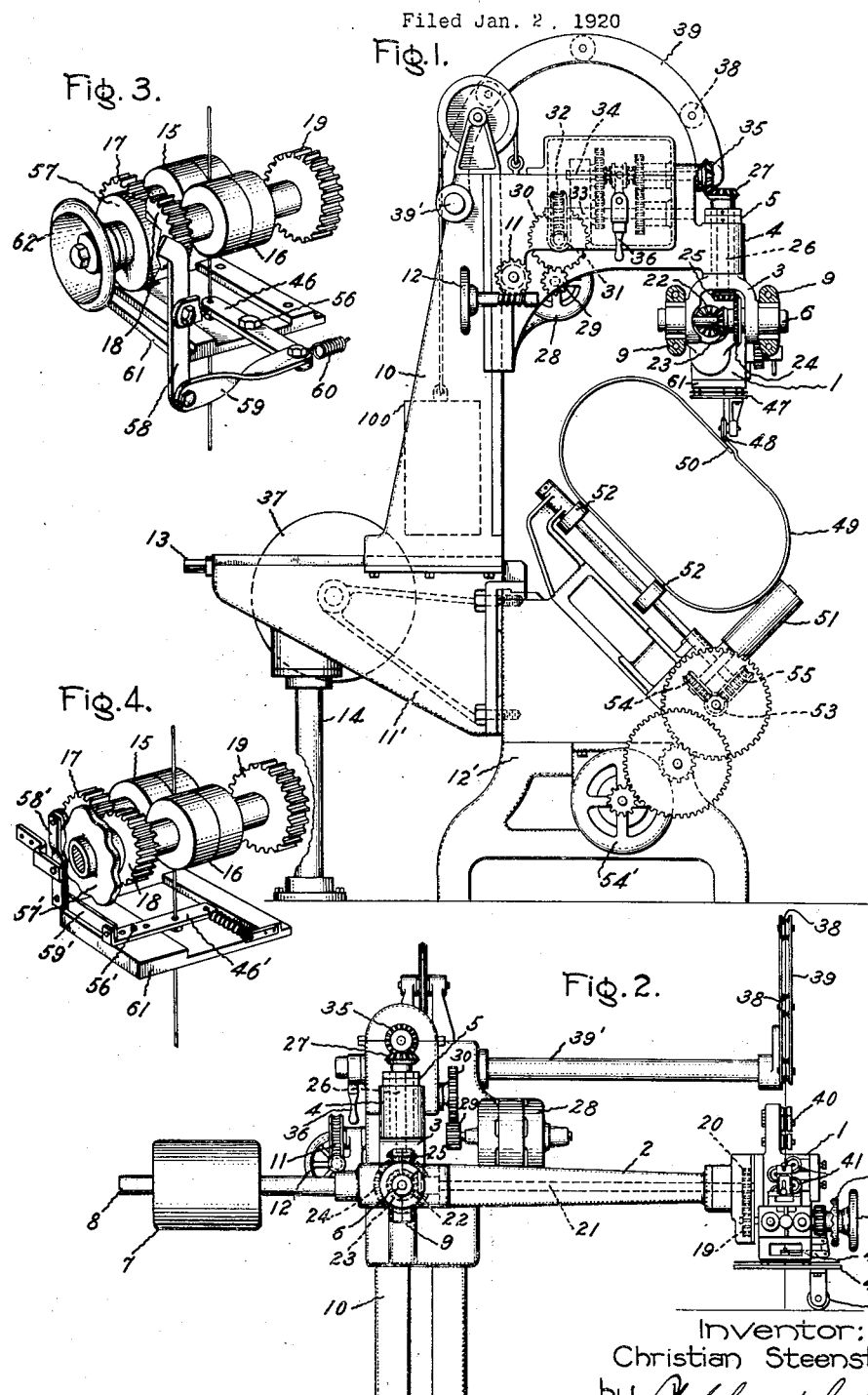
Inventor:
Christian Steenstrup,
by Allen H. Davis
His Attorney.

Patented July 22, 1924.

1,502,489

UNITED STATES PATENT OFFICE.

CHRISTIAN STEENSTRUP, OF SCHENECTADY, NEW YORK, ASSIGNOR TO GENERAL ELECTRIC COMPANY, A CORPORATION OF NEW YORK.

APPARATUS FOR AUTOMATIC ARC WELDING.

Application filed January 2, 1920. Serial No. 348,937.

*To all whom it may concern:*

Be it known that I, CHRISTIAN STEEN-STRUP, a citizen of the United States, residing at Schenectady, in the county of Schenectady, State of New York, have invented certain new and useful Improvements in Apparatus for Automatic Arc Welding, of which the following is a specification.

My invention relates to improvements in electric arc welding apparatus in which automatic means are provided for continuously feeding a welding electrode to the welding arc and in which means are provided to regulate the rate of feed of the electrode, automatically, to maintain the welding arc at substantially constant length.

An object of my invention is to provide a universal mounting for the welding head through which the electrode is automatically fed and to provide means whereby power may be transmitted to operate the welding head in its various positions of adjustment as well as during the time that the adjustment is taking place.

A further object of my invention is to provide means cooperating with the universal mounting for the welding head to guide and position the welding head with respect to the work so that the welding arc accurately follows irregularities in the joint or seam to be welded while the distance of the welding head from the work is maintained substantially constant.

A further object of my invention is to provide a welding head comprising means for oscillating the electrode tip.

Heretofore automatic arc welding machines have been proposed which comprise feed rolls for feeding a welding electrode to the welding arc and an electric motor for driving the feed rolls and means for controlling the speed of the electric motor in accordance with some function of the energy at the welding arc as, for example, the voltage. Arc welding machines arranged for this system of control form the subject matter of the application of Paul O. Noble, Serial No. 323,170, filed September 11, 1919, assigned to the assignee of the present application. My invention relates to improvements in automatic welding apparatus of this type but is not limited in its application further than is indicated in the accompanying specification and the claims appended thereto.

In the accompanying drawing, Fig. 1 represents an end view of an automatic welding machine embodying my improvements. Certain parts are removed in order to show the construction more clearly. In this figure the machine is shown as provided with conveyer mechanism for feeding the work under the welding head. Fig. 2 represents a front view of the welding machine without the conveyer machanism and with a part of the support broken away. Fig. 3 is a perspective view showing in detail the mechanism for oscillating the electrode tip which is embodied in the welding head shown in Fig. 2. Fig. 4 represents a modified form of mechanism for oscillating the electrode tip.

Referring to Figs. 1 and 2 of the drawing, the welding head 1 is mounted on the end of an arm 2 which is movable about horizontal and vertical axes. The part 3 which supports the arm 2 is pivoted for movement about a vertical axis extending through the support 4. A collar 5 holds the part 3 against the support 4. The arm 2 is pivoted about the horizontal axis 6 so that the welding head is arranged for universal movement. The counterweight 7 is adjustably mounted on the arm 8 and arranged to partially balance the weight of the welding head. The arm 8 is secured to the arm 2 by means of bolts passed through the lugs 9.

The support 4 is slidably mounted on the member 10. The member 10 is provided with a rack with which the gear 11, operated by the handwheel 12, cooperates to adjust the welding head vertically upon the support 10. A weight 100 is provided to counterbalance the weight of the member 4 with the devices mounted thereon. The member 10 is adjustably mounted on the bracket 11' which is bolted to the base 12'. A screw 13 is provided for adjusting the member 10 along the member 11'. A post 14 which may be bolted to the floor is preferably provided to prevent any tendency of the overhanging welding head to tip the machine over.

The welding head comprises a pair of rolls 15 and 16 which grip the electrode and feed it to the work as it is consumed.

The welding current is preferably conducted to the electrode by means of these feed rolls. The rolls are caused to rotate at the same speed in opposite directions by gears 17 and 18. A gear 19 is mounted on the shaft of the roll 16 and this gear is driven from the gear 20 mounted on the shaft 21 which extends through the arm 2. A bevel gear 22 on the shaft 21 is driven from a bevel gear 23 which is mounted on the same shaft as a bevel gear 24. Gear 24 is driven by a bevel gear 25 mounted on the vertical shaft 26 and a driving pinion 27 is mounted on the upper end of the shaft 26. On the shaft of the electrode feed motor 28, a pinion 29 is mounted which drives gear 30. A worm 31 mounted on the shaft of gear 30 drives a worm wheel 32 which drives shaft 33. The shaft 33 drives a shaft 34, which carries a bevel gear 35 which engages the bevel gear 27 heretofore referred to. Change speed gearing is provided between the shafts 33 and 34 and this change speed gearing is operated by hand lever 36.

The welding electrode is drawn by the feed rolls 15 and 16 from a reel 37 mounted in any convenient location. The welding electrode is unwound from this reel and drawn over guide rolls 38 mounted in a curved guide 39 supported by an arm 39' secured to member 10. The welding electrode passes from guide 39 between straightening rolls 40 and 41 to the feed rolls 15 and 16. The electrode after leaving the feed rolls passes through a guiding hole in lever 46 to the welding arc. The lever 46 is provided for a purpose hereinafter described.

Between the welding head and the work, radiating plates 47 are provided which shield the welding head from the heat of the arc. A guiding and positioning means, preferably in the form of a tracker roller 48, is mounted on one of the plates 47 and this means causes the arc to follow the joint or seam to be welded and raises and lowers the welding head in accordance with irregularities in the work. Where the arc length is controlled by varying the rate of electrode feed, the length of the electrode carrying current varies with irregularities in the surface of the work which bring it closer to or remove it further away from the welding head unless means are provided for varying the position of the welding head to correspond with such irregularities in the work. If, for example, the tracker roller 48 were omitted from my device, and a hump in the seam to be welded were encountered, the motor 28 would slow down sufficiently to shorten the length of the electrode projecting from the welding head so as to cause the arc to climb over the hump. Similarly, if a depression in the work were encountered, the length of electrode projecting from the welding head would be increased. This method of compensating for irregularities in the work is not adequate where pronounced irregularities, amounting for example to several inches, are encountered for the reason that it is desirable to reduce the length of electrode carrying current to a small value and if such pronounced irregularities are present, the welding head must be adjusted to too great a distance from the work for the best operation. It is apparent that the length of the electrode carrying current corresponds to the distance between the welding arc and the feed rolls 15 and 16 in the machine disclosed in this case. By providing the means 48 to adjust the position of the welding head in accordance with irregularities in the work, I am enabled to reduce this length to a minimum. The radiating plates 47 permit the welding head to be placed close to the work without undue heating thereof by radiation from the hot metal of the weld.

The articles to be welded, which in this case are represented as tanks 49, having a longitudinal joint or seam 50 to be welded, are fed under the welding head by conveyer mechanism having sets of rolls 51 and 52 arranged in planes at right angles to each other. These sets of rolls are driven by worm wheels from a long screw shaft 53 which operates all of the rolls. Worm wheels 54 and 55 for the rolls 51 and 52 appear in the drawing. The conveyer screw 53 is operated by the motor 54' through a train of gears designed to move the work with relation to the welding head at the proper speed to secure the best results for the particular work in hand.

In order to produce wide welds means are provided for oscillating the tip or end of the welding electrode across the seam to be welded. This oscillating mechanism comprises the lever 46 heretofore referred to. Referring to Fig. 3, the lever 46 is represented as pivoted at 56. A cam 57 is mounted on the shaft of the gear 19 which operates feed roll 16 and this cam upon rotation of the gear 19 oscillates the lever 58 which is connected by a link 59 to the lever 46. A spring 60 is arranged to hold the lever 58 against the cam 57. It is obvious that when the gear 19 is rotated an oscillating motion is imparted to lever 46. Since lever 46 is provided with a perforation or its equivalent to guide the electrode, the oscillating motion of lever 46 is imparted to the end of the electrode which projects below the rolls 15 and 16, through the member 61 mounted on the welding head, and through the radiating means 47.

Fig. 4 shows a modified form of the oscillating mechanism. In this modification the mechanism is arranged to oscillate the electrode in a plane at right angles to the plane in which the oscillation takes place in Fig. 3. In this modification the cam surface is provided on the edge of the cam 57'. The cam 57' operates a lever 58' which is arranged to operate guiding lever 46' through link 59'. In this modification the pivot 56' of the lever 46' is arranged so that it may be inserted in any one of several holes in the lever 46' and base 61 so that the amplitude of oscillation of the electrode tip may be adjusted if desired.

The handwheel 62 shown in Figs. 2 and 3 is mounted on the shaft carrying gear 19 and is provided merely to enable the operator to manually assist the starting of the electrode feeding mechanism should the motor 28 fail to start when the circuit is closed.

To operate the apparatus the welding head 1 is adjusted to the desired height by the handwheel 12 and to the desired horizontal position by the screw 13. The conveyer motor 54' is then started and operated to place one of the articles to be welded under the welding head. The motor 28 is then started and this motor feeds the electrode forward until it engages the work and completes the welding circuit, one side of which is connected to the tank 49 through the conveyer rolls and the other side of which is connected to a brush bearing on one of the feed rolls 15 and 16. The welding head is insulated from the conveyer mechanism in any desired way but preferably by making one of the gears 19 or 20 of fiber and placing insulation between the welding head 1 and the arm 2, on which it is mounted. As soon as the electrode engages the work an arc is established. The oscillating mechanism for the electrode tip, when used, assists in striking the arc since the electrode is moving across the work at the time contact is made. The arc having been started, the motor 29 continues to feed the welding electrode through the welding head at such a rate as to keep the length of the welding arc substantially constant, and the motor 54' simultaneously operates the conveyer means to feed the articles to be welded under the welding head. The guiding means 48 causes the welding arc to follow the seam to be welded and guides the welding head from one article to the next as they are successively presented by the conveyer mechanism. In my arrangement the welding head is relieved of the weight of the electrode feed motor and a considerable part of the speed reducing gearing so that the weight and inertia of the parts which must be moved about the universal mounting by the guiding and positioning roller 48 is much reduced and the operation correspondingly improved.

While I have shown the positioning and guiding roller as operating directly along the seam to be welded, it is apparent that where a large number of articles of identical shape are to be welded, that the guiding and positioning means may be arranged to be operated by a template if desired.

While the welding head has been shown as provided with means for oscillating the electrode tip, it is obvious that other features of the invention therein disclosed may be used without the oscillating mechanism if desired. The oscillating mechanism, however, materially improves the operation of the apparatus where the seams to be followed by the guiding means are somewhat irregular since any tendency of the arc to spring to one side of the joint to be welded and remain there is overcome. Furthermore, while the universal mounting for the welding head is peculiarly useful in connection with the automatic guiding and positioning means for the welding head, it is obvious that the universal mounting is of great utility even though the guiding and positioning roller be not used, since the welding head may be manually adjusted to any desired position and clamped in such position. The adaptability of the machine for various welding jobs is thereby increased.

While I have shown and described certain particular embodiments of my invention, such modifications and variations are contemplated as fall within the scope of my invention which is set forth in the appended claims.

What I claim as new and desire to secure by Letters Patent of the United States, is:—

1. An arc welding apparatus comprising a welding head arranged continuously to feed a welding electrode to the work, conveyer mechanism for guiding and feeding articles to be welded into operative relation with the welding head and tracker means for guiding and positioning the welding head with respect to the articles to be welded.

2. In an arc welding apparatus wherein a welding head is arranged to move with relation to the work to be welded and wherein means are arranged to feed a fusible electrode through said head toward the work automatically at a rate depending upon a function of the enegry at the arc, the combination with said welding head of means for guiding the arc along the surfaces to be welded and for adjusting the position of said welding head in accordance with irregularities in the surfaces to be welded.

3. An arc welding apparatus comprising a welding head arranged continuously to feed a welding electrode to the work, and means arranged to adjust the position of the welding head with respect to the work so as to keep the length of electrode projecting from the welding head substantially constant.

4. An arc welding apparatus comprising a welding head provided with means for feeding an electrode to the welding arc, a support, a member carrying the welding head and pivoted upon said support with a universal joint and means for transmitting power through said joint to said welding head to operate the feeding means.

5. An arc welding apparatus comprising a welding head arranged to feed an electrode to a welding arc and an arm mounted for universal adjustment arranged to support said welding head.

6. In an arc welding apparatus wherein a welding head is arranged to move with relation to the work to be welded and wherein means comprising feed rolls mounted in said head are arranged to feed a fusible electrode through said head toward the work automatically at a rate depending upon a function of the energy at the arc to maintain a welding arc, the combination with said welding head of means to adjust the position of the head with respect to the work so as to keep the length of electrode between the feed rolls and the work substantially constant and means for producing an oscillating motion with respect to said head of the end of the electrode projecting from the head.

7. In an arc welding apparatus comprising a welding head and rolls mounted in said head for feeding an electrode to the arc, the combination with said welding head of means comprising a cam mounted on the shaft of one of said rolls arranged to impart an oscillating motion to the welding electrode as it is delivered from the feed rolls.

8. An arc welding apparatus comprising a welding head, rolls mounted in said head arranged to be operated to feed an electrode continuously through said head to the arc, characterized by the provision of a cam driven from the shaft of one of said feed rolls, and electrode guiding means comprising a lever pivotally mounted on said welding head arranged to cooperate with said cam to oscillate the tip of the electrode with respect to the welding head as the electrode is fed through the welding head.

9. An arc welding apparatus comprising a welding head mounted for universal adjustment and arranged continuously to feed a welding electrode to the work, conveyer mechanism for guiding and feeding the work into operative relation with the welding head, tracker means for guiding and positioning the welding head with respect to the joints to be welded and means for imparting an oscillating motion to the tip of the electrode.

10. A welding machine comprising means for supporting and moving the work horizontally with the seam to be welded extending along the upper side thereof, a vertically movable welding device and a cam mounted to move with the work and engageable with said welding device to maintain the relative position thereof with respect to the seam.

In witness whereof, I have hereunto set my hand this 31st day of December, 1919.

CHRISTIAN STEENSTRUP.